(12) United States Patent
Li et al.

(10) Patent No.: US 11,520,144 B2
(45) Date of Patent: Dec. 6, 2022

(54) DISPLAY DEVICE, DISPLAY METHOD THEREOF, AND DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ke Li, Beijing (CN); Yali Liu, Beijing (CN); Ruijun Dong, Beijing (CN); Chenru Wang, Beijing (CN); Hao Zhang, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 298 days.

(21) Appl. No.: 16/649,199

(22) PCT Filed: Apr. 1, 2019

(86) PCT No.: PCT/CN2019/080760
§ 371 (c)(1),
(2) Date: Mar. 20, 2020

(87) PCT Pub. No.: WO2020/199070
PCT Pub. Date: Oct. 8, 2020

(65) Prior Publication Data
US 2021/0255460 A1    Aug. 19, 2021

(51) Int. Cl.
G02B 27/01    (2006.01)
G02B 27/00    (2006.01)
(Continued)

(52) U.S. Cl.
CPC .......... *G02B 27/0172* (2013.01); *G02B 5/10* (2013.01); *G02B 27/0093* (2013.01);
(Continued)

(58) Field of Classification Search
CPC .............. G02B 27/017; G02B 27/0172; G02B 2027/0174; G02B 27/0176; G02B 2027/0178; G02B 2027/0093
See application file for complete search history.

(56) References Cited

U.S. PATENT DOCUMENTS

2011/0182570 A1    7/2011    Yeh

FOREIGN PATENT DOCUMENTS

CN    201107469    8/2008
CN    103377595    10/2013
(Continued)

OTHER PUBLICATIONS

Chinese Office Action and English translation for corresponding Chinese Patent Application No. 201980000451.6, dated Sep. 1, 2021. 13 pages.
(Continued)

*Primary Examiner* — Ryan D Howard
(74) *Attorney, Agent, or Firm* — Leason Ellis LLP

(57) ABSTRACT

A display device, a display method thereof, and a display system. The display device includes at least two display screens; and a light transmission portion, configured to transmit image light emitted by the at least two display screens to a predetermined region. The at least two display screens or the light transmission portion is configured to be movable, so that distances from image planes imaged by the at least two display screens through the light transmission portion to the predetermined region can be adjusted independently.

18 Claims, 4 Drawing Sheets

(51) Int. Cl.
 G02B 5/10 (2006.01)
 G06F 3/01 (2006.01)
(52) U.S. Cl.
 CPC ...... G06F 3/013 (2013.01); *G02B 2027/0123* (2013.01); *G02B 2027/0147* (2013.01)

(56) References Cited

FOREIGN PATENT DOCUMENTS

| CN | 106707531 | | 5/2017 |
|----|-----------|---|--------|
| CN | 108089332 | | 5/2018 |
| JP | 2001045522 A | * | 2/2001 |
| TW | I594019 B | | 8/2017 |

OTHER PUBLICATIONS

Chinese Patent Office Action dated May 11, 2021 corresponding to Chinese Patent Application No. 201980000451.6; 13 pages.

* cited by examiner

DISPLAY DEVICE, DISPLAY METHOD THEREOF, AND DISPLAY SYSTEM

CROSS-REFERENCE TO RELATED PATENT APPLICATIONS

This application is a U.S. National Stage Application under 35 U.S.C. § 371 of International Patent Application No. PCT/CN2019/080760, filed Apr. 1, 2019, which is incorporated by reference in its entirety.

At least one embodiment of the present disclosure relates to a display device, a display method thereof, and a display system.

BACKGROUND

When a human eye is viewing an object, a pupil and a crystalline image the object on a retina, and information is transmitted to a brain after the image of the object is resolved by the retina. The resolution of the retina also has different regions. The resolution of the foveal region is the highest, and the resolution of the region around the foveal region decreases in order. When the eyeball rotates, the object to be viewed is imaged in the foveal region of the retina, and surrounding objects are imaged around the foveal region of the retina. As a result, the human eye can only clearly see the object in a fixation point, and cannot clearly see the object around the fixation point.

SUMMARY

At least one embodiment of the present disclosure provides a display device, a display method thereof, and a display system. The display device includes: at least two display screens; and a light transmission portion, configured to transmit image light emitted by the at least two display screens to a predetermined region. The at least two display screens or the light transmission portion is configured to be movable, so that distances from image planes imaged by the at least two display screens through the light transmission portion to the predetermined region can be adjusted independently.

For example, the display device further includes an eye tracker, configured to determine depth information of a fixation point of an eyeball by tracking a position of the eyeball, where the depth information is information about a distance from the fixation point to the eyeball in a viewing direction of the eyeball, the eyeball is located in the predetermined region; and a controller, connected to the at least two display screens or the light transmission portion as well as the eye tracker, and configured to receive the depth information of the fixation point to adjust distances from the at least two display screens to the light transmission portion, so that the fixation point is located on one of the image planes of the at least two display screens.

For example, the controller is further configured to control the at least two display screens to display, so that a display resolution of an image plane where the fixation point is located is greater than a display resolution of the other of the image planes.

For example, the eye tracker is further configured to determine plane information of the fixation point of the eyeball, the plane information is information about a position of the fixation point in the image plane where the fixation point is located, the controller is further configured to adjust a display resolution of the position of the fixation point in the image plane to be greater than a display resolution of a region outside the fixation point in the image plane, according to the plane information.

For example, the light transmission portion includes at least two first convex lenses and at least one transflective mirror, and each of the at least two first convex lenses is located between one of the at least two display screens and the transflective mirror.

For example, adjusting the positions of the at least two display screens by the controller includes: the controller controls the display screen to move along an optical axis direction of the first convex lens relative to a corresponding first convex lens; or controls the first convex lens to move along the optical axis of the first convex lens relative to a corresponding display screen.

For example, each of the at least two display screens is located at a focal point or within a focal length of the corresponding first convex lens.

For example, an angle between a principle plane of the transflective mirror and a principle plane of the at least two display screen is 45 degrees.

For example, the light transmission portion further includes a light beam adjuster, located on a side of the transflective mirror away from the first convex lens, and configured to adjust a diameter of a light beam directed from the transflective mirror to the eyeball so as to adapt to a pupil size of the eyeball.

For example, the light beam adjuster includes a second convex lens and a third convex lens, and an optical axis of the second convex lens and an optical axis of the third convex lens are on a same straight line; the optical axis of the second convex lens is on the same straight line as an optical axis of one of the at least two first convex lenses, and a center of the transflective mirror is on the straight line.

For example, the display device further includes: an aperture, located between the display screen and the corresponding first convex lens, and all image light emitted by the display screen enters the first convex lens through the aperture.

Another embodiment of the present disclosure provides a display system including two above mentioned display devices, where the at least two display screens included in one of the two display devices and the at least two display screens included in the other of the two display devices are in one-to-one correspondence, image planes of two corresponding display screens respectively located in the two display devices are in a same depth of field, and the two display devices are configured to correspond to two eyes respectively to achieve binocular stereoscopic display.

Another embodiment of the present disclosure provides a display method of a display device, including: adjusting the distances from the image planes imaged by the at least two display screens through the light transmission portion to the predetermined region, so that the eyeballs located in the predetermined region perceive a stereo image formed by images in different depths.

For example, the display method further includes: tracking a position of the eyeball to determine the depth information of the fixation point of the eyeball; adjusting the distance from the display screen to the light transmission portion according to the depth information, so that the fixation point is located on one of the image planes of the at least two display screens.

For example, the display method further includes: adjusting a display resolution of the image plane where the fixation point is located to be greater than a display resolution of the other of the image planes according to the depth information.

For example, the display method further includes: tracking a position of the eyeball to determine the plane information of the fixation point of the eyeball; adjusting a display resolution of the position of the fixation point in the image plane to be greater than a display resolution of a region outside the fixation point in the image plane according to the plane information.

BRIEF DESCRIPTION OF THE DRAWINGS

In order to clearly illustrate the technical solution of embodiments of the present disclosure, the drawings of the embodiments will be briefly described in the following. It is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

Embodiments of the present disclosure provide a display device, a display method thereof, and a display system. The display device includes at least two display screens and a light transmission portion. The distances from image planes imaged by the at least two display screens to the same eyeball are different. The light transmission portion is configured to transmit image light emitted by the at least two display screens to a predetermined region. The at least two display screens or the light transmission portion is configured to be movable so that the distances from the image planes imaged by the at least two display screens through the light transmission portion to the predetermined region can be adjusted independently. In the embodiments of the present disclosure, the at least two image planes are imaged at different positions to achieve displaying the images in different depths, which not only achieves a stereo display effect of the images, but also provides a user with a better experience to reduce the dizziness during viewing.

Hereinafter, the display device, the display method thereof, and the display system provided by the embodiments of the present disclosure will be described in conjunction with the accompanying drawings.

Figure 1A:
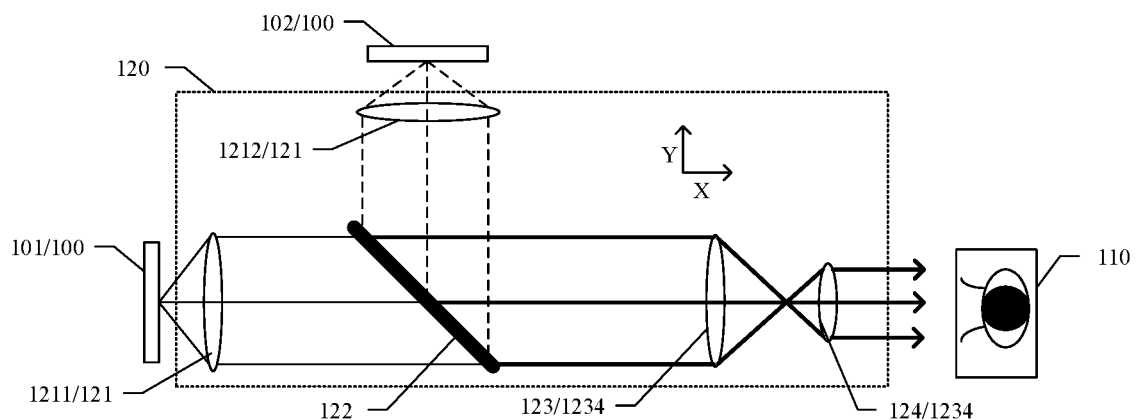
FIG. 1A is a schematic diagram of a partial structure of a display device according to an example of an embodiment of the present disclosure.

An embodiment of the present disclosure provides a display device. FIG. 1A is a schematic diagram of a partial structure of a display device according to an example of the embodiment. As shown in FIG. 1A, the display device includes at least two display screens 100 and a light transmission portion 120. The example illustrates the at least two display screens 100 include two display screens, a first display screen 101 and a second display screen 102, as an example. Distances from image planes imaged by the first display screen 101 and the second display screen 102 to a predetermined region 110 are different, that is, a light path from the first display screen 101 to the predetermined region 110 and a light path from the second display screen 102 to the predetermined region 110 are different, so that the distances from the image planes of the images displayed by the two display screens 100 to the predetermined region 110 are different. The light transmission portion 120 included in the display device is located between the at least two display screens 100 and the predetermined region 110, and is configured to adjust the distances from the image planes imaged by the at least two display screens 100 to the predetermined region 110, so that the eyeball located in the predetermined region 110 senses a stereo image formed by the images in different depths. That is, the light transmission portion 120 can transmit image light of the at least two display screens 100 to the predetermined region 110 (for example, a region where a user's eyeballs are located), and the light transmission portion 120 images the two display screens 100 to form respective image planes. The at least two display screens and the light transmission portion can be moved relative to each other (the display screen or the light transmission portion is moved), so that in a case where the image planes of different display screens have different distances from the predetermined region, the images in different depths can be sensed by the eyeball in the predetermined region, to form the stereo image. In embodiments of the present disclosure, the distances from the image planes of the images displayed by the at least two display screens to the eyeball can be adjusted to be different by the light transmission portion to achieve the images displayed in deferent depths. In addition, the display screen can blur and adjust the definition of the images displayed in different depths, so that the eyeball can perceive a clear stereo image.

Figure 1B:
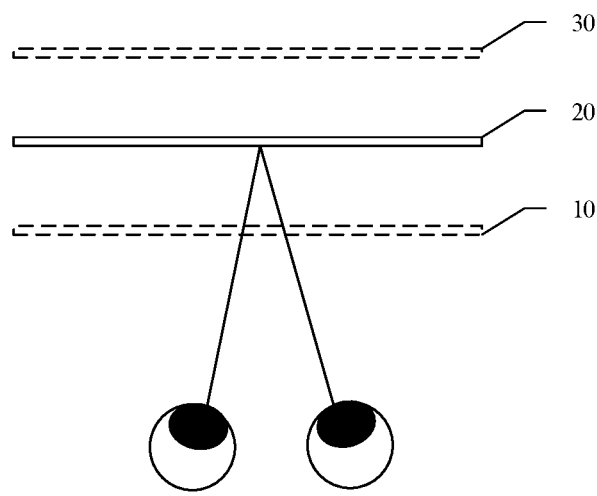
FIG. 1B is a schematic diagram of an effect upon human eyes viewing images in different depths.

For example, FIG. 1B is a schematic diagram of an effect upon the human eye viewing images in different depths. As shown in FIG. 1B, an image 10, an image 20, and an image 30 have different distances from the human eye. The image 10 is closest to the human eye, and the image 30 is farthest from the human eye. According to the characteristics of the human eye, in a case where the user is viewing the image 20, the image 20 will be imaged in the foveal region of the human eye, and the image 10 and the image 30 are in a blurred state because they are not imaged in the foveal region of the human eye. Therefore, according to the position of the fixation point of the human eye, the image displayed at the position of the fixation point can be displayed in high definition, and the images in other depths are displayed in blur, thereby creating the stereo effect of the stereo display image.

In a case where the eyeball in this example views the image plane imaged by the first display screen 101, the image plane will be imaged in the foveal region of the human eye, and the image plane imaged by the second display screen 102 will not be imaged in the foveal region of the human eye. By adjusting the display definition of the first display screen 101 to be higher and the display definition of the second display screen 102 to be lower, the realism of the stereo effect of the image can be improved. In addition, a calculation amount of a display controller can be reduced, and a power consumption can be reduced.

In this example, one eyeball is illustrated as an example, and the display device can achieve a stereo display effect of a single eye.

For example, the display screen 100 can be a micro-display (for example, the diagonal size of the micro-display is usually 0.39 inches, 2.1 inches, or 2.54 inches), or can also be a large-sized display, which is not limited in the embodiment.

For example, as shown in FIG. 1A, the light transmission portion 120 includes at least two first convex lenses 121 and at least one transflective mirror 122. Each of the first convex lenses 121 is located between one of the display screens 100 and the transflective mirror 122, and is configured to converge divergent light emitted from the display screen 100. The transflective mirror 122 is used for transmitting the image light emitted from the first display screen 101 and reflecting the image light emitted from the second display screen 102, so as to combine the image light emitted from the two display screens 100 into a light beam directed toward the predetermined region 110.

For example, the transflective mirror 122 can be a flat mirror or a free-curve surface mirror, etc., provided that it is a device capable of achieving a transflective effect. The embodiment is not limited herein.

For example, as shown in FIG. 1A, the example schematically shows that the light transmission portion 120 includes a first sub-convex lens 1211 located between the first display screen 101 and the transflective mirror 122, and a second sub-convex lens 1212 located between the second display screen 102 and the transflective mirror 122. That is, the first convex lens 121 includes the first sub-convex lens 1211 and the second sub-convex lens 1212.

FIG. 1A schematically shows that the display screen 100 is located at a focal point of the first convex lens 121 so as to converge the divergent light emitted by the display screen 100 into parallel light. The display screen 100 in the embodiment can be located at the focal point or within one focal length of the first convex lens 121. Upon the display screen 100 being located within one focal length of the first convex lens 121, parameters such as the sizes of the first convex lens 121 and the transflective mirror 122 are adjusted, so that the image light emitted by the display screen 100 can enter the predetermined region 110 as much as possible, and the image displayed by the display screen 100 passes through the first convex lens 121 to image as an upright virtual image.

For example, the adjustment of the distances from the image planes imaged by the display screens 100 to the predetermined region 110 by the light transmission portion 120 can include: a position of the first convex lens 121 is unchanged, and the two display screens 100 are moved within one focal length of the first convex lens 121 along a direction of an optical axis of the first convex lens 121; or a position of the display screen 100 is unchanged, and the first convex lens 121 is moved along the direction of the optical axis thereof, and the display screen 100 is ensured to move within the one focal length of the first convex lens 121 during the movement. Thus, a virtual image imaged by the display screen 100 through the first convex lens 121 is adjusted to move to a proper position on a side of the display screen 100 away from the predetermined region 110 to achieve the stereo display effect of the images in different depths.

The above-mentioned optical axis direction of the first convex lens 121 refers to a direction perpendicular to a principal plane of the first convex lens 121. The movement of the display screen 100 along the optical axis direction of the first convex lens 121 refers to: the optical axis direction of the first sub-convex lens 1211 corresponding to the first display screen 101 is a X direction shown in the figures, then the first display screen 101 is moved in the X direction; the optical axis direction of the second sub-convex lens 1212 corresponding to the second display screen 102 is a Y direction shown in the figures, the second display screen 102 moves in the Y direction.

Figure 1C:
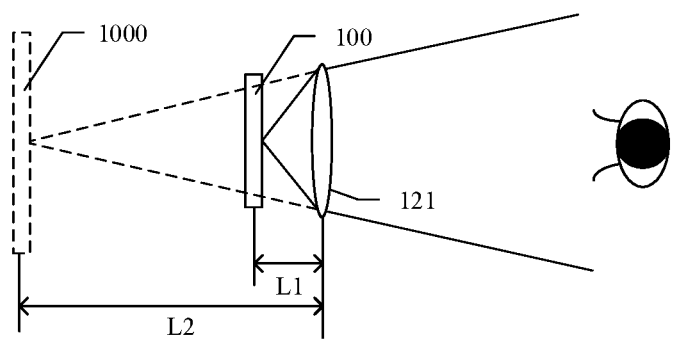
FIG. 1C is a schematic diagram illustrating a principle of adjusting a distance from a display screen to a first convex lens in FIG. 1A to adjust a distance from an image plane of the display screen to an eyeball.

FIG. 1C is a schematic diagram of adjusting the distance from the display screen to the first convex lens in FIG. 1A to adjust the distance from the image plane imaged by the display screen to the eyeball. As shown in FIG. 1C, the distance from the display screen 100 to the first convex lens 121 is an object distance L1, and the distance from the virtual image 1000 imaged by the image of the display screen through the first convex lens 121 to the first convex lens 121 is an image distance L2. The movement of the display screen 100 along the optical axis direction of the first convex lens 121 is to adjust the object distance L1 from the display screen 100 to the first convex lens 121. According to a principle of paraxial optical imaging, when the display screen 100 is located within one focal length of the first convex lens 121, an enlarged virtual image 1000 will be imaged by the image displayed on the display screen 100 on the same side. By adjusting the object distance L1 from the display screen 100 to the first convex lens 121, the image distance L2 from the virtual image 1000 to the first convex lens 121 can be adjusted, so that the distance from the virtual image 1000 to the eyeball can be changed.

For example, as shown in FIG. 1A, an orthographic projection of the display screen 100 on a plane parallel to the principle plane of the display screen 100 completely falls into an orthographic projection of the corresponding first convex lens 121 on the plane. For example, the first display screen 101 is illustrated as an example, a size of the first display screen 101 along the Y direction is smaller than a size of the first sub-convex lens 1211 corresponding to the first display screen 101 in the Y direction, so that the image light emitted by the first display screen 101 can as much as possible propagate to the position of the predetermined region 110 through the first convex lens 121.

For example, as shown in FIG. 1A, an angle between the principle plane of the transflective mirror 122 and the principle plane of the display screen 100 is 45 degrees. That is, the principle plane of the transflective mirror 122 is on an angle bisector between the optical axes of the two first convex lenses 121, so that the image light emitted by the two display screens 100 can be converged into one light beam to propagate to the predetermined region 110.

For example, as shown in FIG. 1A, the light transmission portion 120 further includes a second convex lens 123 and a third convex lens 124, which are located between the predetermined region 110 and the transflective mirror 122. The second convex lens 123 and the third convex lens 124 are included in a light beam adjuster 1234, which can adjust the diameter of the light beam directed from the transflective mirror 122 to the predetermined region 110 so as to adapt the pupil size of the eyeball located in the predetermined region 110.

For example, the light beam adjuster 1234 can increase or decrease the diameter of the light beam directed from the transflective mirror 122 to the predetermined region 110 to adapt the size of the pupil. The light beam adjuster in the embodiment is not limited to the combination of the two convex lenses, and a concave lens can be sandwiched between the two convex lenses, which is not limited in the embodiment.

For example, as shown in FIG. 1A, the optical axes of the second convex lens 123, the third convex lens 124, and one of the at least two first convex lenses 121 are on the same straight line, and the center of the transflective mirror 122 is on the straight line to ensure the position of the displayed image will not be shifted. The example schematically shows that the optical axis of the first sub-convex lens 1211 corresponding to the first display screen 101 and the optical axis of the light beam adjuster 1234 are on the same straight line.

During operation of the display device in the example, according to the clear effect of the stereo image perceived by the eyeball of the user and the image to be viewed, the user can manually or automatically adjust the distances from the plurality of the display screens to the light transmission portion to adjust the distances from the image planes imaged by the display screens to the eyeball, and the blur and definition of the displayed image in different depths, so that the clear stereo image is viewed. In the example, the eyeball adjusts the eye lens so that image planes in different depths displayed by the display device are imaged in the foveal region of the human eye, which can improve the user's experience in viewing the stereo image and reduce the visual fatigue in viewing the stereo image.

Figure 2A:
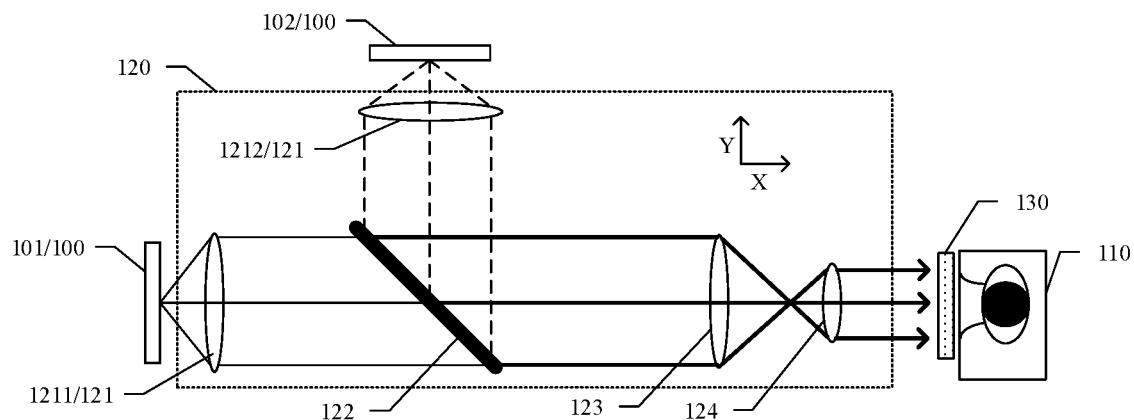
FIGS. 2A and 2B are schematic diagrams of a partial structure of a display device according to another example of an embodiment of the present disclosure.
Figure 2B:
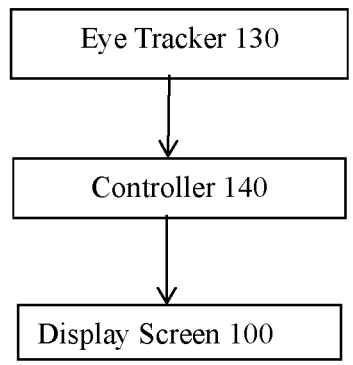

For example, FIGS. 2A and 2B are schematic diagrams of a partial structure of a display device according to another example of the embodiment. As shown in FIGS. 2A and 2B, the display device further includes an eye tracker 130 and a controller 140. The eye tracker 130 is located in front of the predetermined region 110 and is configured to track the position of the eyeball located in the predetermined region 110 to determine depth information and plane information of the fixation point of the eyeball, that is, the eye tracker 130 is used to detect the position of the pupil to get information about the fixation point. The depth information is information about the distance from the fixation point to the eyeball in the viewing direction of the eyeball, and the plane information is information about the position of the fixation point in the image plane where the fixation point is located.

An eye tracking technology is applied to the display device including the eye tracker provided by the example, the eye tracker decides the fixation point of the user by tracking the position of the user's eyeball, and then performs interactive instructions, such as rendering of the fixation region. Currently, the eye tracking technology is mostly applied to flat-panel display devices or head-mounted display devices. In the head-mounted display devices, a miniature wide-angle camera placed near the eye is usually used to track the position of the eyeball. In a dark environment, in order to prevent the light emitted from the light source of the eye tracker from interfering with the visible light emitted from the display screen, a conventional eye tracker uses an infrared light source to supplement light to the eyeball, which facilitates the camera to acquire the position information of the pupil of the human eye. Currently, the tracking accuracy of the eye trackers can reach about 0.5°.

For example, the eye tracker can include an eyeball detection portion and a data processing portion. The eyeball detection portion is used to acquire the user's eyeball position and movement, etc., and the data processing portion is used to process the data acquired by the eyeball detection portion to obtain the depth information and the plane information of the fixation point of the eyeball.

For example, as shown in FIGS. 2A and 2B, the controller 140 is connected to the eye tracker 130, and the controller 140 is connected to the at least two display screens 100 or the light transmission portion 120, and is configured to receive the information of the fixation point to adjust the distances from the at least two display screens 100 to the first convex lenses 121 so that the distances from the image planes of the at least two display screens to the predetermined region are different.

For example, as shown in FIG. 2A, adjustment of the distances from the at least two display screens 100 to the first convex lenses 121 by the controller 140 includes: the controller 140 controls the display screen 100 to move along the optical axis direction of the first convex lens 121 relative to the first convex lens 121 corresponding to the display screen 100; or controls the first convex lens 121 to move along the optical axis direction of the first convex lens 121 relative to the display screen 100 corresponding to the first convex lens 121.

For example, the position of the first convex lens 121 is unchanged, and the controller 140 controls the display screen 100 to move along the optical axis direction of the first convex lens 121 within the focal length of the first convex lens 121; or the position of the display screen 100 is unchanged, the controller 140 controls the first convex lens 121 to move along the optical axis direction of the first convex lens 121 and the display screen 100 is located within the focal length of the first convex lens 121, so as to adjust the virtual image imaged by the display screen 100 through the first convex lens 121 to move to a proper position on a side of the display screen 100 away from the predetermined region 110, to achieve the stereo display.

For example, the controller 140 controls the first display screen 101 to move along the X direction, and the controller 140 controls the second display screen 102 to move along the Y direction.

For example, the image plane imaged by the first display screen 101 is to be viewed by the eyeball, the image plane will be imaged in the foveal region of the human eye and the image plane imaged by the second display screen 102 will not be imaged in the foveal region of the human eye. That is, the fixation point is located on one of the image planes of the at least two display screens 100. The controller 140 can also adjust the first display screen 101 to display a clear image, and adjust the second display screen 102 to display a slightly blurred image, thereby improving the realism of the stereo image effect. That is, the controller 140 is further configured to control the at least two display screens 100 to display, so that a display resolution of the image plane where the fixation point is located is greater than a display resolution of the other image plane(s) of the at least two display screens.

According to the characteristics of the fixation point of the human eye, because the resolution of the foveal region of the retina is the highest, the resolution of the surrounding region decreases in order. When the eyeball rotates, the object to be viewed is imaged in the foveal region of the retina, and the surrounding objects are imaged around the foveal region of the retina. As a result, the human eye can only clearly see the objects in the region where the fixation point is located and cannot clearly see objects around the fixation point. Generally, an angle between a high-definition region around the fixation point and the pupil of the human eye is 5°, and the resolution of the human eye to a region which is centered at the fixation point and has the angle between the fixation point and the pupil of the eye larger than 5° decreases rapidly.

For example, in the embodiment, the controller 140 is further configured to adjust the display resolution at the position of the fixation point in the image plane to be greater than the display resolution of the region outside the fixation point in the image plane according to the plane information.

For example, in a case where the image plane imaged by the first display screen 101 is adjusted to the position of the fixation point and the image displayed in the display region which is centered at the fixation point and has the included angle of 5° with the pupil of the human eye is a human face, the display resolution of the first display screen 101 is adjusted so that a resolution of the human face in the image is greater than a resolution of other positions. At the same time, because the image plane imaged by the second display screen 102 is not located in the foveal region of the retina, the display resolution of the second display screen 102 is adjusted to be lower than the resolution of the position of the human face in the first display screen 101, to achieve rendering the near-eye image with different resolutions in different regions, thereby reducing a processing amount of a hardware central processing unit (CPU).

For example, the controller can refer to implementing the control function by using the hardware, that is, without considering the cost, those skilled in the art can construct corresponding hardware circuits to implement the control function. For example, the hardware circuit includes a conventional very large-scale integration (VLSI) circuit or a gate array, and an existing semiconductor such as a logic chip, a transistor, or other discrete components. For example, the controller can also be implemented by a programmable hardware device, such as a field programmable gate array, a programmable array logic, and a programmable logic device, which is not limited in the embodiment.

For example, the controller can also refer to implementing the control function by using software algorithms to execute by various types of processors. For example, considering the existing hardware technology, the controller can be a module implemented by the software algorithms.

Figure 2C:
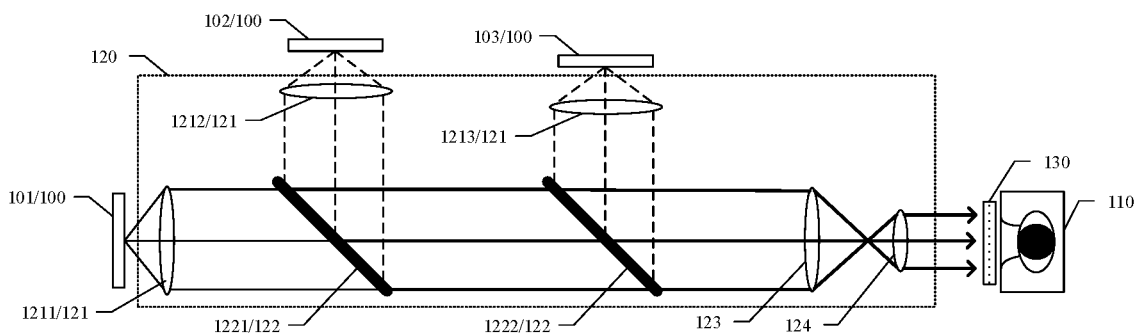
FIG. 2C is a schematic diagram of a partial structure of a display device according to another example of an embodiment of the present disclosure.

For example, FIG. 2C is a schematic diagram of a partial structure of a display device according to another example of the embodiment. As shown in FIG. 2C, the number of display screens 100 can be three, that is, the three display screens 100 further include a third display screen 103. In this case, the number of the first convex lenses 121 is also three, and the first convex lenses 121 correspond to the display screens 100 one by one, that is, the three first convex lenses 121 further include a third sub-convex lens 1213 (first convex lens 121) corresponding to the third display screen 103. The number of the transflective mirrors 122 is two, that is, the two transflective mirrors 122 include a first transflective mirror 1221 and a second transflective mirror 1222. The first transflective mirror 1221 combines the image light of the first display screen 101 and the image light of the second display screen 102 into a first combined light beam directed toward the predetermined region 110. The second transflective mirror 1222 combines the first combined light beam and the image light of the third display screen 103 into a second combined light beam directed toward the predetermined region 110.

The example illustrates an example in which the number of the display screens is three. The principle of implementing the images in different depths is the same as the principle shown in FIG. 2A, which details will be omitted herein. The example is not limited to the number of the display screens and the number of the first convex lenses both being three, but it can also be four or more. The larger the number of the display screens is, the stronger the stereo display effect with more depths can be achieved, and thus it is easy to render the images with different depths at the position of the fixation point of the eyeball.

Figure 3:
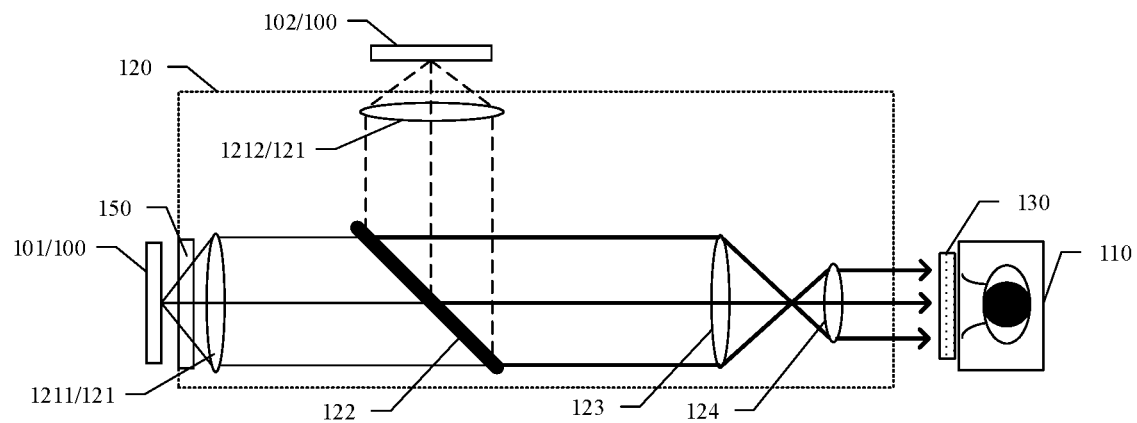
FIG. 3 is a schematic diagram of a partial structure of a display device according to another example of an embodiment of the present disclosure.

For example, FIG. 3 is a schematic diagram of a partial structure of a display device according to another example of the embodiment. As shown in FIG. 3, the display device further includes an aperture 150 located between the display screen 100 and the corresponding first convex lens 121, and all image light emitted by the display screen 100 enters the first convex lens 121 through the aperture 150 to prevent stray light outside the display screen 100 entering the first convex lens 121 to improve the display effect.

For example, a planar shape of the display screen 100 can be rectangular, a shape of the aperture 150 can be circular, and a diameter of the aperture 150 is not less than a length of the diagonal of the display screen 100.

For example, FIG. 3 schematically shows that the aperture 150 is located between the first display screen 101 and the corresponding first sub-convex lens 1211, but it is not limited to this. Another aperture also can be disposed between the second display screen 102 and the corresponding second sub-convex lens 1212, that is, one aperture can be disposed between each of the display screens 100 and the corresponding first convex lens 121.

For example, the display device according to the embodiments can be a display device, such as a liquid crystal display device, an organic light-emitting diode (OLED) display device etc., and the display device can be any products or components having displaying function and including a television set, a digital camera, a cell phone, a watch, a tablet, a laptop, a navigator, etc., and the embodiments are not limited to this.

Figure 4A:
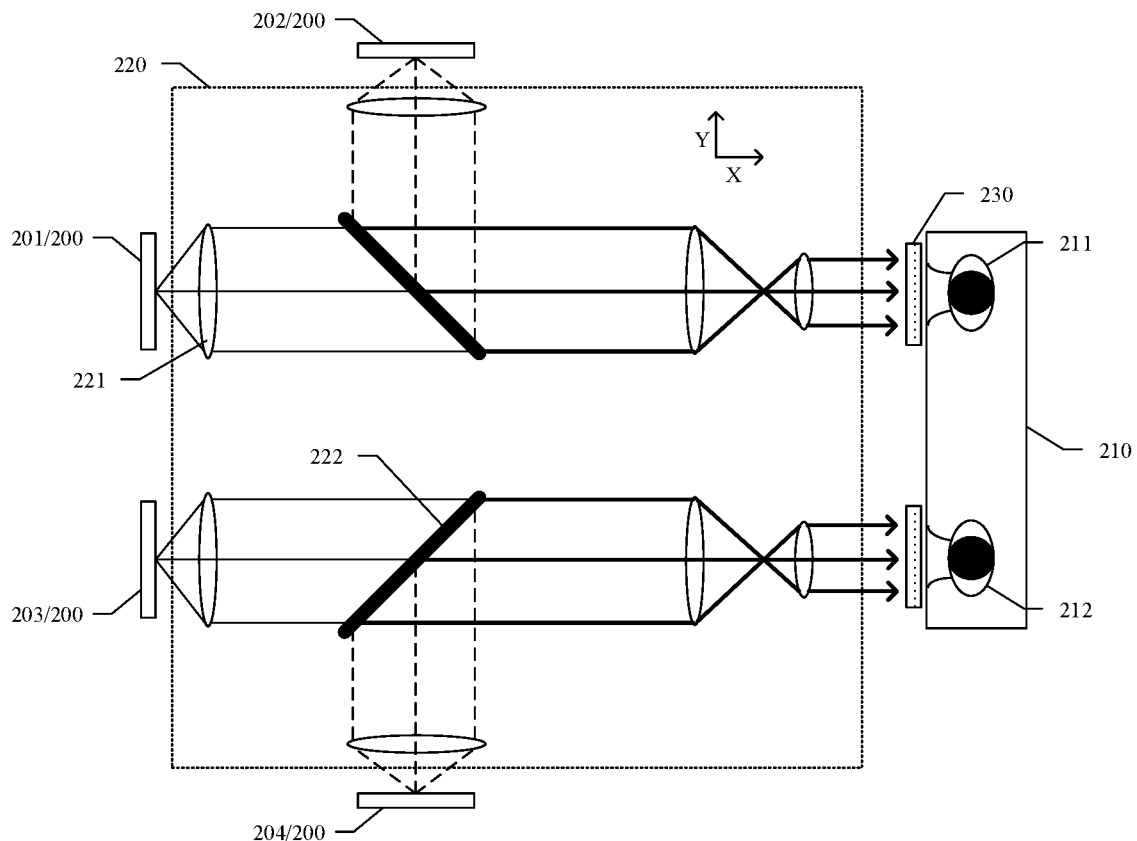
FIG. 4A is a schematic diagram of a partial structure of a display system according to an example of another embodiment of the present disclosure.
Figure 4B:
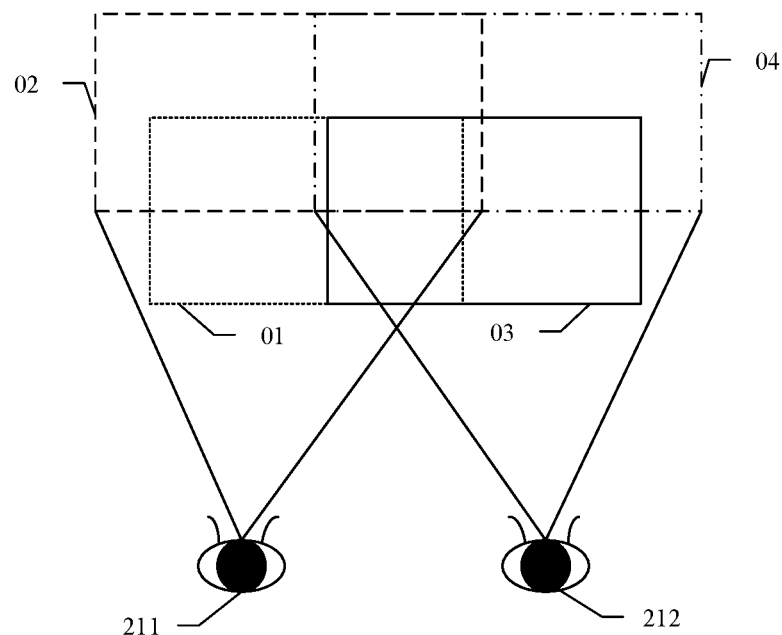
FIG. 4B is a schematic diagram of a binocular display image displayed by the display system shown in FIG. 4A.

FIG. 4A is a schematic diagram of a partial structure of a display system according to an example of another embodiment of the present disclosure, and FIG. 4B is a schematic diagram of a binocular display image displayed by the display system shown in FIG. 4A. As shown in FIG. 4A, the display system according to the embodiment includes two display devices according to any one of the foregoing examples. A plurality of display screens 200 of one of the two display devices and a plurality of display devices of the other of the two display devices are in one-to-one correspondence, the image planes of two corresponding display screens 200 respectively located in the two display devices are located in the same depth of field, and each of the display devices is configured to correspond to one eyeball of both eyes to achieve the binocular stereoscopic display. For example, the display screen 201 in the first display device corresponds to the display screen 203 in the second display device, and the image planes of them are at the same depth of field; the display screen 202 in the first display device corresponds to the display screen 204 in the second device, and the image planes of them are at the same depth of field. FIG. 4A schematically shows that the display device included in the display system is the display device shown in FIG. 2A. The display system can include the light transmission portion 220, the eye tracker 130 for tracking the position of the eyeball 210, and the plurality of display screens 200.

For example, as shown in FIG. 4A, the two display devices can be placed symmetrically, but it is not limited to this, and can also be placed asymmetrically.

For example, as shown in FIG. 4A, in the display system, the display device corresponding to the first eyeball 211 includes a first display screen 201 and a second display screen 202, and the display device corresponding to the second eyeball 212 includes a third display screen 203 and a fourth display screen 204. A distance from an image plane imaged by the first display screen 201 to the first eyeball 211 is equal to a distance from an image plane imaged by the third display screen 203 to the second eyeball 212, and a distance from an image plane imaged by the second display screen 202 to the first eyeball 211 is equal to a distance from an image plane imaged by the fourth display screen 204 to the second eyeball 212. That is, the image planes of the corresponding two display screens respectively in the two display devices are located in the same depth of field, i.e. the image planes imaged by the first display screen 201 and the third display screen 203 are located in the same depth of field, and the image planes imaged by the second display screen 202 and the four display screens 204 are located in the same depth of field.

For example, as shown in FIGS. 4A and 4B, the four display screens 100 display images with different two depths, i.e. the first eyeball 211 views the first image 01 displayed by the first display screen 201 and the second image 02 displayed by the second display screen 202, and the second eyeball 212 views the third image 03 displayed by the third display screen 203 and the fourth image 04 displayed by the fourth display screen 204. In order to achieve the binoculus stereo effect, the first image 01 displayed on the first display screen 201 and the third image 03 displayed on the third display screen 203 have the same portion and different portions, and the same portion is the image displayed at an overlapping position of the two eye-ball viewing regions. Similarly, the second image 02 displayed on the second display screen 202 and the fourth image 04 displayed on the fourth display screen 204 have the same portion and different portions, and the same portion is the image displayed at an overlapping position of the two eye-ball viewing regions.

For example, the embodiment is not limited to the above-mentioned four images with different depths, and the above-mentioned four images can also be in the same depth. When achieving the stereo effect due to the binocular parallax, the display resolution at the position of the fixation point is set to be greater than the display resolution of the region outside the fixation point in the image plane, that is, the region outside the fixation point is blurred, which can reduce the process amount of the hardware central processing unit (CPU).

For example, in order to prevent the image light displayed on the two display devices from interfering with each other, a light shielding layer (not shown in the figures) can be disposed between the two transflective mirrors 222.

The principle of achieving the stereo display effect by the display system in the embodiment is the same as the principle of achieving the stereo display effect by the display device shown in FIG. 2A, which will be omitted herein.

Figure 4C:
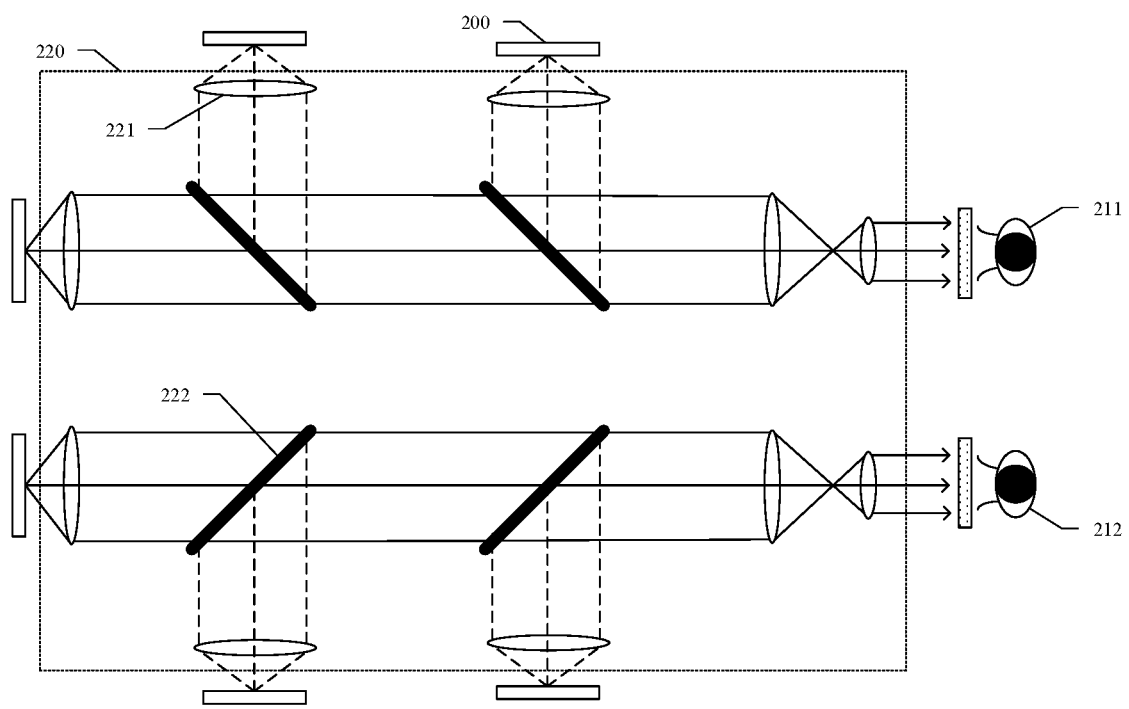
FIG. 4C is a schematic diagram of a partial structure of a display system according to another example of an embodiment of the present disclosure.

FIG. 4C is a schematic diagram of a partial structure of a display system according to another example of the embodiment. The display system shown in FIG. 4C is different from the display system shown in FIG. 4A in that each of the display devices in this example includes three display screens 200, three first convex lenses 221, and two transflective mirrors 222.

The example illustrates an example in which the number of display screens is three, and the principle of achieving binocular stereoscopic display is the same as the principle shown in FIG. 4A. The example is not limited to the number of the display screens and the first convex lenses being three, and the number of the display screens and the first convex lenses can also be four or more. The larger the number of display screens is, the stronger the stereo display effect with more depths can be achieved, and thus it is easy to render the images with different depths at the position of the fixation point of the eyeball.

In the display system according to the embodiment, at least two image planes are imaged at different positions to achieve displaying images in different depths, which not only achieves the stereo display effect of the images, but also provides a user with a better experience to reduce the dizziness during viewing.

Another embodiment of the present disclosure provides a display method of the above mentioned display device. The display method includes: adjusting the distances from the image planes imaged by the at least two display screens through the light transmission portion to the predetermined region, so that the eyeball located in the predetermined region perceives the stereo image formed by the images in different depths.

For example, as shown in FIG. 1A, the two display screens 100 are adjusted to move along the optical axis direction of the first convex lens 121 within the focal length of the first convex lens 121, or the position of the display screen 100 is unchanged, and the first convex lens 121 is moved along the direction of the optical axis of the first convex lens 121, and the display screen 100 is ensured to be within the focal length of the first convex lens 121 during the movement, so as to adjust the virtual image imaged by the display screen 100 through the first convex lens 121 to move to a proper position on a side of the display screen 100 away from the eyeball, to achieve the stereo display.

For example, in a case where the eyeball views the image plane imaged by the first display screen 101, the image plane will be imaged in the foveal region of the human eye, and the image plane imaged by the second display screen 102 will not be imaged in the foveal region of the human eye. The first display screen 101 is adjusted to display a clear image, and the second display screen 102 is adjusted to display a slightly blurred image, which can improve the realism of the stereo effect of the images.

Therefore, according to the clear effect of the stereo image perceived by the eyeball and the image to be viewed, the user can manually or automatically adjust the distance from the plurality of the display screens to the eyeball of the user, and the blur and definition of the displayed images in different depths, so that the clear stereo image is viewed.

For example, the display method according to the embodiment further includes: tracking the position of the eyeball to determine the depth information of the fixation point of the eyeball; and adjusting the distance from the display screen to the light transmission portion according to the depth information, so that the fixation point is located on one of the at least two display screens.

For example, as shown in FIG. 2A, the eye tracker 130 tracks the position of the eyeball located in the predetermined region 110, and the controller 140 receives the depth information of the fixation point and adjusts the positions of the at least two display screens 100 or the light transmission portion 120.

For example, as shown in FIG. 2A, the adjustment of the distances from the at least two display screens 100 to the first convex lenses 121 by the controller 140 includes: the controller 140 controls the display screen 100 to move along the optical axis direction of the corresponding first convex lens 121 relative to the corresponding first convex lens 121; or controls the first convex lens 121 to move along the optical axis direction of the first convex lens 121 relative to the corresponding display screen 100.

For example, the display method further includes: adjusting the display resolution of the image plane where the fixation point is located to be greater than the display resolution of the other of the depth image planes according to the depth information.

For example, in a case where the eyeball views the image plane imaged by the first display screen 101, the image plane will be imaged in the foveal region of the human eye, and the image plane imaged by the second display screen 102 will not be imaged in the foveal region of the human eye. The controller 140 can further adjust the first display screen 101 to display a clear image, and adjust the second display screen 102 to display a slightly blurred image, which improves the realism of the stereo effect of the images.

For example, the display method further includes: tracking the position of the eyeball to determine the plane information of the fixation point of the eyeball; adjusting the display resolution of the position of the fixation point in the image plane to be greater than the display resolution of the region outside the fixation point in the image plane according to the plane information.

For example, the controller 140 can further adjust the display resolution of the display screen 100 according to the received plane information detected by the eye tracker 130 so that the display resolution of the position of the fixation point is greater than the display resolution of the region outside the fixation point in the image plane.

For example, in a case where the image plane imaged by the first display screen 101 is adjusted to the position of the fixation point, and the image displayed in the display region which is centered at the fixation point and has an included angle of 5° with the pupil of the human eye is a human face, the display resolution of the first display screen 101 is adjusted so that a resolution of the human face in the image is greater than a resolution of other positions. At the same time, because the image plane imaged by the second display screen 102 is not located in the foveal region of the retina, the display resolution of the second display screen 102 is adjusted to be lower than the resolution of the position of the human face in the first display screen 101, to achieve rendering the near-eye image with different resolutions in different regions, thereby reducing a processing amount of a hardware central processing unit (CPU).

In the display method according to the embodiment, at least two image planes are imaged at different positions to achieve displaying images in different depths, which not only achieves a stereo display effect of images, but also provides a user with a better experience to reduce the dizziness during viewing.

The following statements should be noted:

(1) The accompanying drawings involve only the structure(s) in connection with the embodiment(s) of the present disclosure, and other structure(s) can be referred to common design(s).

(2) In case of no conflict, features in the same embodiment or in different embodiments can be combined.

What have been described above are only specific implementations of the present disclosure, the protection scope of the present disclosure is not limited thereto. The protection scope of the present disclosure should be based on the protection scope of the claims.

What is claimed is:

1. A display device, comprising:
   at least two display screens;
   a light transmission portion, configured to transmit image light emitted by the at least two display screens to a predetermined region,
   wherein the at least two display screens or the light transmission portion is configured to be movable, so that distances from image planes imaged by the at least two display screens through the light transmission portion to the predetermined region can be adjusted independently,
   the display device further comprises:
   an eye tracker, configured to determine depth information of a fixation point of an eyeball by tracking a position of the eyeball, wherein the depth information is information about a distance from the fixation point to the eyeball in a viewing direction of the eyeball, the eyeball is located in the predetermined region; and
   a controller, connected to the eye tracker and at least one of the display screens and the light transmission portion, and configured to receive the depth information of the fixation point to adjust distances from the at least two display screens to the light transmission portion, so that the fixation point is located on one of the image planes of the at least two display screens.

2. The display device according to claim 1, wherein the controller is further configured to control the at least two display screens to display, so that a display resolution of the image plane where the fixation point is located is greater than a display resolution of the other of the image planes.

3. The display device according to claim 1, wherein the eye tracker is further configured to determine plane information of the fixation point of the eyeball, the plane information is information about a position of the fixation point in the image plane where the fixation point is located, the controller is further configured to adjust a display resolution of the position of the fixation point in the image plane to be greater than a display resolution of a region outside the fixation point in the image plane, according to the plane information.

4. The display device according to claim 1, wherein the light transmission portion comprises at least two first convex lenses and at least one transflective mirror, and each of the at least two first convex lenses is located between one of the at least two display screens and one transflective mirror.

5. The display device according to claim 4, wherein the controller is configured to control the at least two display screens to move along an optical axis direction of the first convex lens relative to a corresponding first convex lens; or control the at least two first convex lenses to move along the optical axis of the first convex lens relative to a corresponding display screen.

6. The display device according to claim 5, wherein each of the at least two display screens is located at a focal point or within a focal length of the corresponding first convex lens.

7. The display device according to claim 4, wherein an angle between a principle plane of the at least one transflective mirror and a principle plane of the at least two display screens is 45 degrees.

8. The display device according to claim 4, wherein the light transmission portion further comprises:
a light beam adjuster, located on a side of the at least one transflective mirror away from one of the at least two the first convex lenses, and configured to adjust a diameter of a light beam directed from the at least one transflective mirror to the eyeball so as to adapt to a pupil size of the eyeball.

9. The display device according to claim 8, wherein the light beam adjuster comprises a second convex lens and a third convex lens, and an optical axis of the second convex lens and an optical axis of the third convex lens are on a same straight line; the optical axis of the second convex lens is on the same straight line as an optical axis of one of the at least two first convex lenses, and a center of the at least one transflective mirror is on the straight line.

10. The display device according to claim 4, further comprising:
an aperture, located between the at least two display screens and the corresponding first convex lens, and all image light emitted by the display screen enters the first convex lens through the aperture.

11. A display method of a display device according to claim 1, comprising:
adjusting the distances from the image planes imaged by the at least two display screens through the light transmission portion to the predetermined region, so that the eyeballs located in the predetermined region perceive a stereo image formed by images in different depths.

12. The display method according to claim 11, further comprising:
tracking a position of the eyeball to determine the depth information of the fixation point of the eyeball; and
adjusting the distances from the at least two display screens to the light transmission portion according to the depth information, so that the fixation point is located on one of the image planes of the at least two display screens.

13. The display method according to claim 12, further comprising:
adjusting a display resolution of the image plane where the fixation point is located to be greater than a display resolution of the other of the image planes according to the depth information.

14. The display method according to claim 12, further comprising:
tracking a position of the eyeball to determine plane information of the fixation point of the eyeball; and
adjusting a display resolution of the position of the fixation point in the image plane to be greater than a display resolution of a region outside the fixation point in the image plane according to the plane information.

15. The display device according to claim 4, wherein a count of the at least two first convex lenses is the same as a count of the at least two display screens, and the at least two display screens and the at least two first convex lenses are in one-to-one correspondence.

16. The display device according to claim 15, wherein a count of the at least two first convex lenses is one more than that of the at least one transflective mirror.

17. The display device according to claim 8, wherein the light beam adjuster and at least one display screen are located on a same side of the at least one transflective mirror, and the light beam adjuster and one display screen are located on two sides of the at least one transflective mirror.

18. A display system comprising: two display devices, each of the two display devices comprises at least two display screens;
a light transmission portion, configured to transmit image light emitted by the at least two display screens to a predetermined region,
wherein the at least two display screens or the light transmission portion is configured to be movable, so that distances from image planes imaged by the at least two display screens through the light transmission portion to the predetermined region can be adjusted independently,
wherein the at least two display screens in one of the two display devices and the at least two display screens in the other of the two display devices are in one-to-one correspondence, image planes of two corresponding display screens respectively located in the two display devices are in a same depth of field, and the two display devices are configured to correspond to two eyes respectively to achieve binocular stereoscopic display.

* * * * *